dow Systems with Wausau's Air Flow Windows".
United States Patent [19]
Howe, Jr.

[11] Patent Number: 4,577,619
[45] Date of Patent: Mar. 25, 1986

[54] ENERGY EFFICIENT WINDOW AND SKYLIGHT ASSEMBLIES

[76] Inventor: William C. Howe, Jr., 4311 Park View Dr., Salt Lake City, Utah 84117

[21] Appl. No.: 531,172

[22] Filed: Sep. 8, 1983

[51] Int. Cl.[4] ........................................ E04D 13/18
[52] U.S. Cl. .................................. 126/431; 126/429; 52/200
[58] Field of Search ............... 126/431, 429, 444, 417, 126/428, 419; 52/200, 18, 80, 306, 304, 171, 172; 47/17

[56] References Cited

U.S. PATENT DOCUMENTS

| 246,626 | 9/1881 | Morse | 126/429 |
|---|---|---|---|
| 2,170,877 | 8/1939 | Simon | 156/17 |
| 2,239,528 | 4/1941 | Knudsen | 20/56.5 |
| 2,281,071 | 4/1942 | Knudsen | 20/56.5 |
| 2,288,465 | 6/1942 | Knudsen | 20/56.5 |
| 2,566,640 | 9/1951 | Smith | 160/107 |
| 2,593,104 | 4/1952 | Colangelo | 160/107 |
| 3,097,688 | 7/1963 | Schwartz | 160/30 |
| 3,253,644 | 5/1966 | Gotoh et al. | 160/107 |
| 3,389,737 | 6/1968 | Arnold et al. | 160/107 |
| 3,925,945 | 12/1975 | White | 126/431 X |
| 4,002,159 | 1/1977 | Angilletta | 126/429 |
| 4,046,133 | 9/1977 | Cook | 126/429 |
| 4,050,443 | 9/1977 | Peck et al. | 126/429 |
| 4,183,398 | 1/1980 | Ehrke | 126/431 X |
| 4,185,616 | 1/1980 | Johnson | 126/444 X |
| 4,212,292 | 7/1980 | Reinert | 126/429 X |
| 4,327,795 | 5/1982 | Wheeler | 160/98 |
| 4,337,756 | 7/1982 | Serapioni | 126/444 X |
| 4,369,828 | 1/1983 | Tatro | 160/107 |
| 4,436,084 | 3/1984 | Carlston et al. | 126/429 |

OTHER PUBLICATIONS

J. Gabrielsson, "Extract-Air Window, A Key to Better Heat Economy in Buildings," paper presented at the 10th World Energy Conference, Istanbul, (Sep. 19-23, 1977).
"Turnabout House," University of Utah Review, vol. 12, No. 3, (Dec. 1978).
"Spending a Lot of Energy on Saving a Lot of Energy," University of Utah Review, vol. 13, No. 3 (Dec. 1979).
O. Seppänen, "Cost Effective Energy Conservation in an Office Building," International Congress on Building Energy Management, Póvoa de Varzim, Portugal (May 12-16, 1980).
K. Brandle and R. F. Boehm, "Air-Flow Windows: Performance and Applications."
"Ekono House America," an advertising brochure of Ekowindow, Inc., Bellevue, Wash.
"The Air Curtain Window," advertising brochure of Ekowindow, Inc., Bellevue, Wash.
"Stop the Waste! Save with Carda," advertising brochure of Carda, a Division of A. O. Stilwell Co., Inc.
K. Brandle, "Air-Flow Windows and Facades".
"Wausau Metals—The Performance of EKONO Window Systems with Wausau's Air Flow Windows".
"Carda Windows and Doors," advertising brochure of Carda, a Division of A. O. Stilwell Co., Inc., Buffalo, N.Y.
"How to Compare Other Thermal Barriers with Wausau's 'Thermolock,'" advertising brochure of Wausau Metals Corp., Wausau, Wisc.
"Comstock Center—Description," bulletin of Burt Hill Kosar Rittelmann Associates.
"Nanik's Secondary System is the Primary Solution," advertising brochure of Nanik Division of Wausau Metals Corp., Wausau, Wisc.

Primary Examiner—Larry Jones
Attorney, Agent, or Firm—Workman, Nydegger & Jensen

[57] ABSTRACT

Energy efficient window and skylight assemblies having self-contained ventilating systems. Two sheets of a transparent or translucent material are spaced apart in parallel relationship so as to form an air flow channel between the sheets. An adjustable shade is positioned in the air flow channel to regulate the amount of sunlight passing through the window and skylight assemblies. A fan in the top or bottom of the assembly causes air to be drawn into the assembly and passed through the air flow channel where it absorbs heat from the shade and sides of the assembly. This air is then directed into the building to provide heat or is vented to the outside to decrease the heat gain in the building.

19 Claims, 4 Drawing Figures

ENERGY EFFICIENT WINDOW AND SKYLIGHT ASSEMBLIES

BACKGROUND

1. The Field of the Invention

The present invention relates to structures for admitting sunlight and air into the interior of a building and, more particularly, is directed to energy efficient air flow windows and skylight structures having a self-contained fan and ventilating system.

2. In the Prior Art

The use of windows and skylights in buildings is an ancient practice which was developed to bring into a building the daylight, the heat, the ventilation, and the beauty of the out-of-doors. Additionally, windows and skylights provide aesthetic, psychological, and physiological benefits for humans and other animals.

While windows and skylights have several advantages, they are also disadvantageous in many respects. Historically, windows have not been as thermally efficient as the other structural elements of a building. Thus, during the cold winter months, a significant portion of the heat loss from the building occurs through the windows.

In addition, during the hot summer months, the building can experience excessive heat gain caused by solar radiant heat. This excess heat must be removed by air conditioning units which utilize energy at the highest cost level. In addition, sunlight passing through windows can cause fading of furnishings and discomfort to the occupants of the building from the glare and exposure of their bodies to direct solar radiation.

Because of the current high cost of energy, efforts have been made to develop methods for reducing the heat loss in winter and heat gain in summer which occurs through windows and skylights. Drapes and curtains have long been used as a method of blocking out direct solar radiation. While this can reduce the fading of furnishings and the discomfort caused by glare, drapes and curtains are not very effective at reducing heat loss and heat gain.

Tinted windows have been developed to reduce the amount of solar radiant heat which can enter the building, but their effect is minimal. Additionally, double and triple pane windows have been utilized to increase the thermal barrier to prevent heat loss or gain caused by the difference in indoor and outdoor temperatures.

A significant improvement in the energy efficiency of windows came with the development of the air flow window. These windows include at least two panes of glass with an air space formed therebetween. A stream of air is circulated through the space between the windows and becomes an integral part of the heating-ventilating-air conditioning system (hereinafter sometimes referred to as the "HVAC system") of the building. Venetian or other types of blinds can be included in the space between the windows to shade the interior of the building and to absorb the sun's radiant heat. The heat can then be transferred to the air flowing through the window and thence into the HVAC system of the building where it assists in heating during the winter and where it can be ventilated during the summer to reduce the heat gain.

While air flow windows have proven to be a major advancement in the development of energy efficient windows, they have not found wide acceptance in small buildings or in existing buildings for several reasons. First, an extensive engineering analysis is generally required to integrate the windows into the total HVAC system. These calculations require the determination of the amount of heat which can be obtained or which must be disposed of depending upon the heating or cooling needs of the building. Second, it is necessary to run ducts to each of the windows in order to collect the air and transfer it to the HVAC system. This significantly adds to the cost of a new building and is almost impossible to perform when retrofitting an existing structure.

Accordingly, what is needed in the art is an energy efficient window and skylight which can take advantage of enclosed blinds and an air flow system which does not need to be incorporated into the HVAC system of the building. It would be a further advancement in the art to provide such a window and skylight which could be used in existing structures as a replacement item as well as in new building construction. Such apparatus are disclosed and claimed herein.

BRIEF SUMMARY AND OBJECTS OF THE INVENTION

The present invention relates to unique window and skylight assemblies which are energy efficient and include a self-contained ventilation system. The assemblies include at least two parallel panes of glass which form the major surfaces of an air flow chamber. A venetian-type blind or other suitable shading device is positioned in the air chamber such that it can be selectively positioned so that the blind can block, reflect, or absorb the sunlight passing through the window.

The head and sill portions of the assembly are constructed of hollow box-like units, and one of the units is equipped with a small motor and fan to create an air flow through the chamber between the glass panes. The head and sill portions also include air ports leading to both the interior and exterior of the building. Preferably, these air ports can be selectively opened and closed to regulate the amount and the direction of the air flowing through the window according to the requirements created by the time of the year and the time of the day. The air ports can be operated manually, or they can be motorized.

The assembly of the present invention can either be placed in a wall of a structure to act as a window or can be placed in the ceiling to function as a skylight. The assembly of the present invention is suitable for use in new construction or in remodeling of existing construction, either as a modification of the existing fenestration, or as a replacement of the existing fenestration.

It is, therefore, a primary object of the present invention to provide window and skylight assemblies which are energy efficient and which can be operated as self-contained units independent of the HVAC system of a building.

It is a further object of the present invention to provide energy efficient window and skylight assemblies which can be used in either new construction or in retrofit applications in existing structures.

It is another object of the present invention to provide an air flow skylight having a blind or shade contained therein to selectively control the amount of light and heat entering the building.

These and other objects and features of the present invention will become more fully apparent from the following description and appended claims taken in conjunction with the accompanying drawings.

BRIEF DESCRIPTION OF THE DRAWINGS

Reference is next made to the drawings in which like parts are designated with like numerals throughout and in which.

DETAILED DESCRIPTION OF THE PREFERRED EMBODIMENTS

The present invention relates to unique window and skylight assemblies which are highly energy efficient and include self-contained ventilation systems. Because of the self-contained nature of the present invention, the assemblies can be used in either new construction, or they can be used to modify or replace the fenestration of existing structures.

Figure 1:
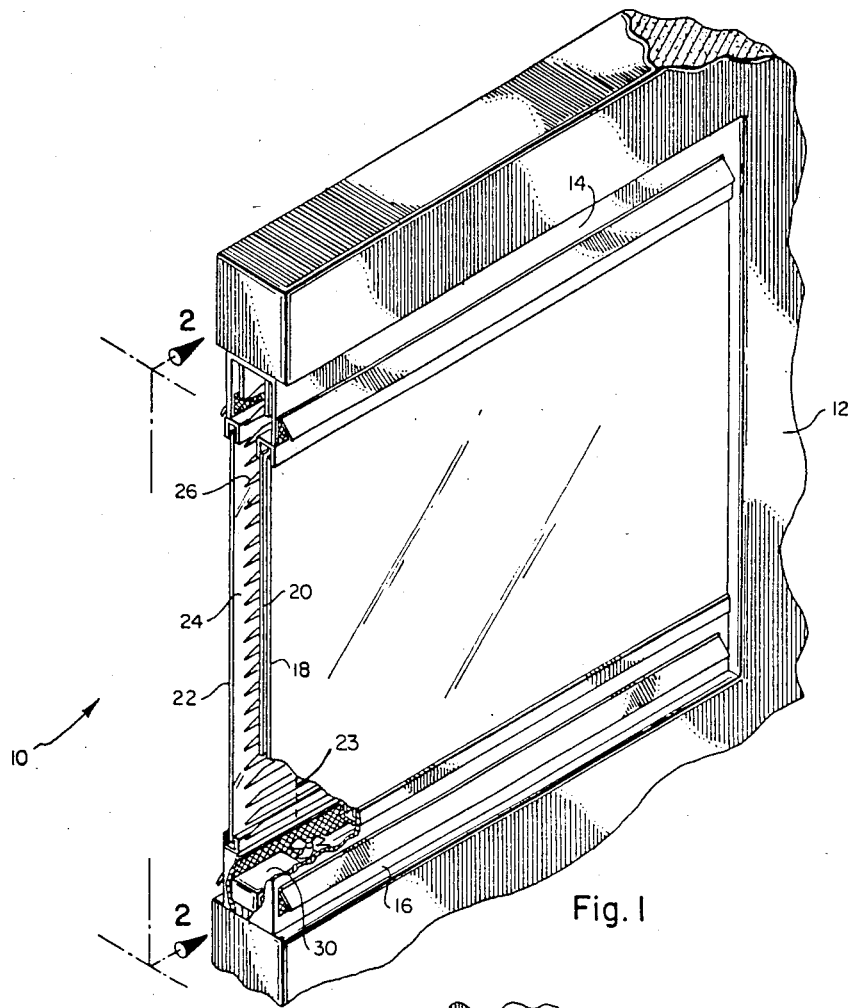
FIG. 1 is a partially cutaway perspective illustration of an energy efficient window constructed in accordance with the present invention.

Reference is now made to FIG. 1 which illustrates a window assembly, generally designated 10, in a partially cutaway perspective view. Window assembly 10 is installed in a wall 12 and includes a generally hollow head 14 and a generally hollow sill 16. As more fully discussed hereinafter, head 14 and sill 16 provide the means for controlling the flow of air through window assembly 10. The window assembly 10 also includes a pair of window jams 13 positioned on each side of the window assembly 10. Window jams 13 extend between head 14 and sill 16. FIG. 1 illustrates one such window jam 13 on the side of the window assembly 10 which is not cut away.

A first pane of glass 18 is positioned in window assembly 10 to form the major exterior surface of the assembly. It will be appreciated that other types of transparent materials such as plastics could also be used to form pane 18. Additionally, translucent glass and plastics can also be utilized in the present invention. Such translucent materials are often desirable for use in skylights because of aesthetic considerations.

In the embodiment illustrated in FIG. 1, a second pane 20 of glass is positioned a short distance behind and substantially parallel to pane 18, thereby creating a small air space between panes 18 and 20 which can act as a thermal barrier. A third pane of glass 22 is spaced apart from, and substantially parallel to pane 20 so as to define an air flow chamber 24 formed by panes of glass 20 and 22, window jams 13, head 14 and sill 16. Pane 22 also forms the major surface of the interior of window assembly 10. While three panes are used in the preferred embodiment, it will be appreciated that the assembly ould also be constructed using only panes 18 and 22.

A venetian-type blind 26 of the type well known in the art is preferably secured in head 14 such that it can extend down into air flow chamber 24. When blind 26 is vertically retracted a maximum amount of light will pass through the window assembly.

In the extended position, blind 26 can be used to selectively control the amount and the direction of the sunlight which enters the interior of the building. As more fully discussed hereinafter, besides controlling the amount of light which enters the interior of the building, blind 26 also serves to convert a portion of the sunlight into heat such that it can be used to heat the building during the winter or can be discharged to prevent the heat from entering the building during the summer. While the preferred embodiment is a venetian-type blind, it will be appreciated that other types of blinds and shades can also be used. Besides the energy related functions, the shades also provide a means for obtaining privacy.

A motor and fan assembly 30 is positioned in the bottom of sill 16 to cause air to pass through window assembly 10 as described below. Fan assembly 30 causes air to pass from sill 16 up through air flow chamber 24 and into head 14. As the air passes through chamber 24, it absorbs the heat created by the sunlight passing through the window panes and striking blind 26. It will be appreciated that fan assembly 30 could also be positioned in head 14 to draw air up through chamber 24 or could be configured so as to force air down through chamber 24.

Head 14 and sill 16 are provided with a series of openings to control the direction and the quantity of air flowing through assembly 10. A damper 32 is positioned on the exterior surface of sill 16 and can be raised so as to expose an opening 33 covered by screen 34. Screen 34 prevents dust and insects from entering assembly 10 through opening 33 when damper 32 is raised.

A similar damper 36 is formed on the interior surface of sill 16 and can be raised to expose an opening 37 covered by a screen 38. By selectively opening damper 32 of damper 36, air can be drawn into assembly 10 from either the exterior or interior of the building. The air which is drawn into sill 16 is forced by fan 30 up through air flow chamber 24.

Head 14 includes a damper 40 which can be raised to expose an opening 41 covered by screen 42 leading to the exterior of the building and a damper 44 which can be selectively raised to expose an opening 45 covered by screen 46. If damper 40 is opened, the air passing up through chamber 34 is expelled to the exterior of the building. If damper 44 is opened, the air passing up through chamber 24 is expelled into the interior of the building. Thus, dampers 40 and 44 can be selectively used to discharge the air passing through assembly 10 to either the exterior or the interior of the building.

As will readily be appreciated, by selectively opening dampers 32, 36, 40, and 44, the direction of air flow can be modified to accommodate different heating and cooling needs depending on the time of day and time of year. For example, during the winter months when the interior of the building is being heated, dampers 36 and 44 can be opened to cause the air on the interior of the building to circulate through air flow chamber 24. Thus, the heat, which is collected as the sun strikes blind 26, can be recovered and transferred into the interior of the room to assist in heating the building.

Alternatively, during the summer months, blind 26 can be positioned so as block the sunlight, and air can be directed though the openings controlled by dampers 32 and 40 so that the heat remains on the exterior of the building. This configuration of the present invention decreases the load which is placed on the air conditioning system of the building. The system can also be used to draw cool air into the building at night.

While the ventilation means in the illustrated embodiment are formed by hinged dampers, those skilled in the art will appreciate that other types of ports and openings could also be used. Also, the dampers can either be controlled manually or can be connected to a motorized or other automatic system.

Figure 3:
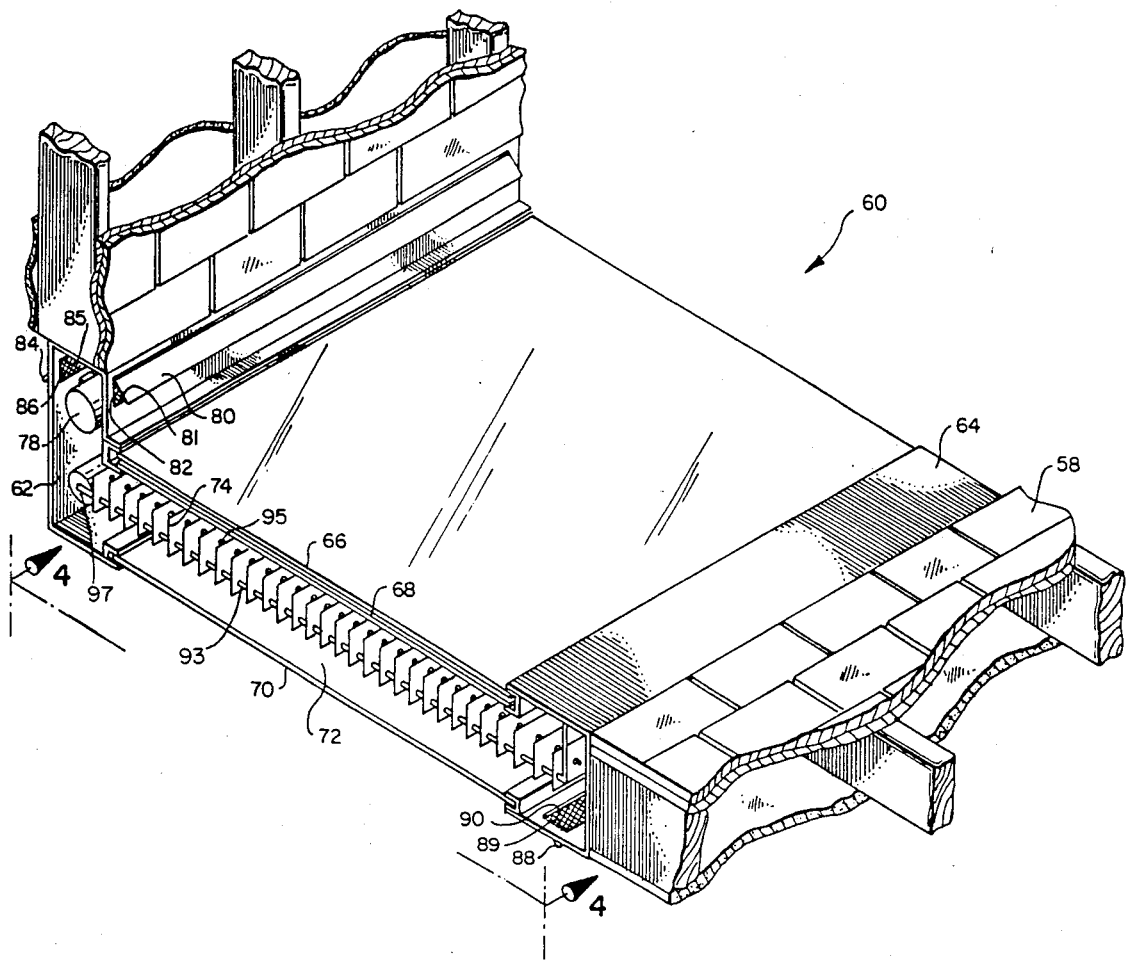
FIG. 3 is a partially cutaway perspective illustration of an energy efficient skylight constructed in accordance with the present invention.
Figure 4:
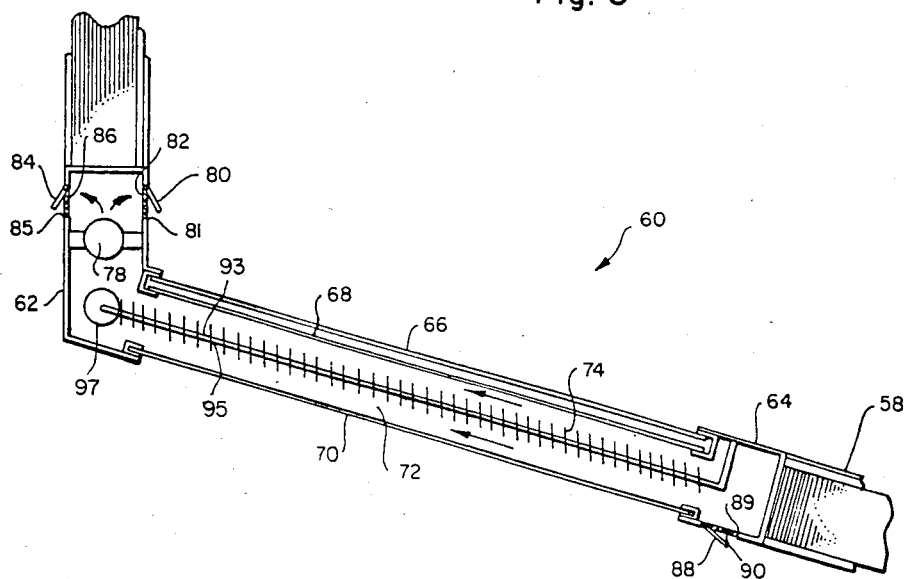
FIG. 4 is a cross-sectional view of the energy efficient skylight of FIG. 3 as taken along line 4—4.

Reference is next made to FIGS. 3 and 4 which illustrate a second embodiment wherein the present invention is utilized as a skylight, generally designated as 60. Skylight 60 is supported by roof 58 and includes a head portion 62 and a sill portion 64 which are formed as generally hollow boxes.

Figure 2:
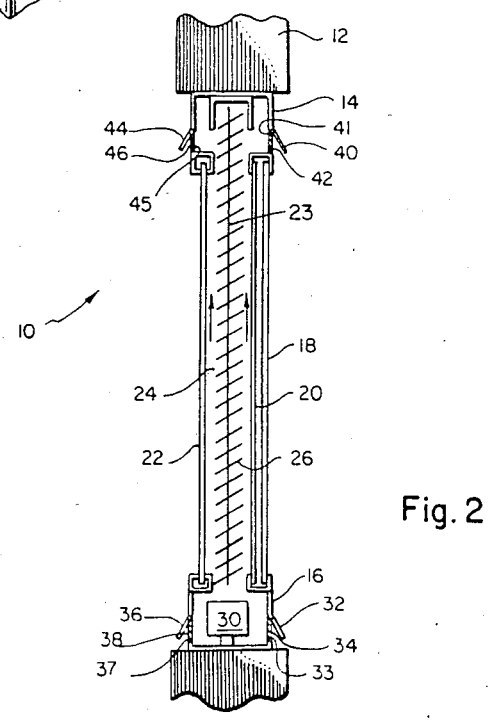
FIG. 2 is a cross-sectional view of the energy efficient window of FIG. 1 as taken along line 2—2 showing the shade in the extended position.

In the embodiment illustrated in FIGS. 3 and 4, the major exterior surface of skylight 60 is defined by a pane 66 of transparent or translucent material. A second pane 68 is spaced apart from pane 66 so as to create a small air space therebetween which can act as a thermal barrier. As with the window embodiment illustrated in FIGS. 1 and 2, a third pane 70 is spaced from pane 68 so as to create an air flow chamber 72.

A venetian-type blind 74 is positioned in chamber 72 where it can be used to selectively control the amount of sunlight passing through skylight 60. The method of operation of blind 26 in FIGS. 1 and 2 and blind 74 in FIGS. 3 and 4 is well known in the art. The individual slats of the blind 26 or 74 are rotated by operating the cords 23 (FIG. 2) or 93 and 95 (FIG. 3) attached to the slats. As shown best in FIGS. 3 and 4, the cords 93 and 95 are in turn attached to a conventional mechanism schematically indicated at 97 which causes the cords, and ultimately the slats, to rotate as desired, thus regulating the amount of sunlight depending on the angle of the slats. In addition, the cords allow the blind to be vertically extended, vertically retracted or partially extended. The blinds are thus open or shut and extended or retracted in the manner of a conventional venetian blind to regulate the sunlight passing through the assembly. A motor and fan assembly 78 is also positioned within head 62 to draw air through skylight 60. As with the embodiment of FIG. 1, it will be readily appreciated that fan 78 could also be positioned in sill 64.

A series of openings are provided in skylight 60 to allow air to be selectively drawn through air flow chamber 72. A damper 80 is positioned on the exterior surface of head 62 and can be opened to reveal an opening 81 covered by screen 82 such that air can flow from head 62 to the exterior of the building. A similar damper 84 is included on the interior surface of head 62 and can be opened to reveal an opening 85 covered by screen 86 so that air can be discharged into the interior of the building. A damper 88 and opening 89 are provided in the interior surface of sill 64 to provide a means for air to be drawn into skylight 60. A filter screen 90 preferably covers opening 89 in order to prevent insects and dust from entering skylight 60.

By selectively opening and closing dampers 80, 84, and 90, air can be drawn through skylight 60 to either heat the building or to remove heat so as to maintain a cooler temperature in the building. Air is drawn into skylight 60 through opening 89. During the summer, this air is discharged to the exterior of the building through opening 81 thereby removing some of the heated air that normally accumulates along the ceiling and also the heated air caused when the sunlight strikes blind 74.

During the winter, the air drawn through opening 89 is discharged through opening 86 into the interior of the building to recover the heat collected in channel 72 as the sunlight strikes blind 74.

While skylight 60 has been illustrated as a generally planar skylight, it will be recognized by those skilled in the art that other configurations could also be used.

As can be seen from the foregoing, the present invention provides a unique window and skylight assembly which is highly energy efficient such that it can reduce the energy requirements of the HVAC system of a building. By selectively positioning the blind within the assembly and by directing air through the assembly it is possible to collect heat for either use in the building or for discharge to the exterior of the building.

Since the ventilation system of the present invention is totally self-contained, the windows and skylights of the present invention can be installed as modifications or replacements in existing buildings or in new building constructions.

It should further be appreciated that while the present invention has been particularly described in reference to the presently preferred embodiments, the invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All modifications or changes which come within the meaning and range of eqivalency of the claims are to be embraced within their scope.

What is claimed and desired to be secured by United States Letters Patent is:

1. A totally self-contained apparatus for use as a window or skylight assembly, and adapted for simultaneously controlling the amount of both sunlight and air admitted into a building, said apparatus comprising:
   a head member and a sill member;
   a first sheet of material through which sunlight can pass, said first sheet of material forming a major portion of the exterior surface of said apparatus and being mounted between said head and sill members;
   a second sheet of material through which sunlight can pass, said second sheet of material being spaced from said first sheet of material said second sheet of material forming a major portion of the interior surface of said window apparatus and being mounted between said head and sill members;
   first and second window jams positioned between said first and second sheets of material and extending from said head member to said sill member so as to form an essentially enclosed air flow channel;
   means, positioned in said air flow channel, for regulating the amount of sunlight passing through said apparatus; and
   ventilation means for directing air through said air flow channel, and comprising a motor-driven fan mounted within said air flow channel at one end thereof so as to circulate air through said air flow channel together with a plurality of apertures disposed in said head and sill members for placing said air flow channel in communication with the interior and exterior of said building and means for selectively opening and closing said apertures whereby air may selectively flow from one of (a) the outside to the inside of said building, (b) from the inside to the outside of said building, (c) from the inside of said building through said air flow channel and back to the inside of said building and (d) from the outside of said building through said air flow channel and back to the outside of said building.

2. An apparatus for admitting sunlight into the interior of a building as defined in claim 1 wherein the first and second window panes comprise translucent sheets of material.

3. An apparaus as defined in claim 1 wherein said first and second sheets of material are formed from glass.

4. An apparatus as defined in claim 1 wherein said means for regulating the amount of sunlight comprises a venetian blind.

5. An apparatus as defined in claim 1 wherein said ventilation means comprises a first exhaust aperture connecting said air flow channel with the interior of said building and a second exhaust aperture connecting said air flow channel with the exterior of the building.

6. An apparatus as defined in claim 5 wherein said ventilation means further comprises an inlet aperture connecting said air flow channel with the interior of the building.

7. An apparatus as defined in claim 6 wherein said ventilation means further comprises an inlet aperture connecting said air flow channel with the exterior of said building.

8. An apparatus as defined in claim 7 wherein said ventilation system further comprises a means for selectively opening and closing said first and second inlet apertures and said first and second exhaust apertures so as to control the direction of air flow through said window.

9. An apparatus as defined in claim 7 wherein each said exhaust and inlet aperture is independently operable.

10. An apparatus as defined in claim 1 wherein said window further comprises a third sheet of material through which sunlight can pass, said third sheet being positioned within said air flow channel and spaced from said first sheet of transparent material so as to form an air space therebetween.

11. An apparatus for admitting sunlight and air into the interior of a building, said apparatus comprising:
a head member and a sill member;
a first sheet of material through which sunlight can pass, said first sheet of material being positioned between said members and forming a portion of the exterior surface of said apparatus;
a second sheet of material through which sunlight can pass, said second sheet of material being positioned between said members and being spaced apart from and parallel to said first sheet so as to form an air space between said first and second sheets;
a third sheet of material through which sunlight can pass, said third sheet of material being positioned between said members and being spaced apart from and parallel to said second sheet, said second sheet forming a portion of the interior surface of said apparatus;
first and second window jams positioned between said first and third sheets of material and extending from said head member to said sill member so as to form an essentially enclosed air flow channel;
means, positioned in said air flow channel, for regulating the amount of light passing through said skylight; and
ventilation means for directing air through said air flow channel, said ventilation means comprising a fan mounted at one end of said air flow channel adjacent the ends of said second and third sheets of material, and said ventilation means further comprising a first exhaust aperture connecting said air flow channel with the interior of said building and a second exhaust aperture connecting said air flow channel with the exterior of the building, and an inlet aperature connecting said air flow channel with the interior of the building together with means for selectively opening and closing said apertures whereby air may selectively flow from one of (a) the outside to the inside of said building, (b) from the inside to the outside of said building, (c) from the inside of said building through said air flow channel and back to the inside of said building and (d) from the outside of said building through said air flow channel and back to the outside of said building.

12. A totally self-contained apparatus for use as a window or skylight assembly, and adapted for simultaneously controlling the amount of both sunlight and air admitted into a building, said apparatus comprising:
a head member and a sill member, and first and second window panes positioned between said head and sill members and spaced from one another and first and second window jams positioned between said window panes and extending from said head member to said sill member so as to form an essentially enclosed air flow channel between said window panes, and said window panes permitting entry of sunlight into said building:
means, positioned in said air flow channel, for regulating the amount of sunlight admitted through said window panes;
ventilation means for controlling the direction of air flow through said air flow channel comprising a plurality of aperatures disposed in said head and sill members for placing said air flow channel in communication with the interior and exterior of said building and means for selectively opening and closing said apertures; and
forced air means, mounted in one of said head and sill members, for forcing said air flow through said air flow chamber whereby said forced air means cooperates with said ventilation means such that air may selectively flow from one of (a) the outside to the inside of said building, (b) from the inside to the outside of said building, (c) from the inside of said building through said air chamber and back to the inside of said building and (d) from the outside of said building through said air chamber and back to the outside of said building.

13. An apparatus as defined in claim 12 wherein said means for regulating the amount of sunlight admitted through said window panes comprises a plurality of rotatable slats which are positioned in a substantially parallel configuration.

14. An apparatus as defined in claim 12 wherein said means for regulating the amount of sunlight admitted through said window panes comprises a venetian blind.

15. An apparatus as defined in claim 12 wherein said forced air means comprises a fan and a motor in one of said head and sill members.

16. An apparatus as defined in claim 12 wherein said ventilation means comprises a first exhaust aperture connecting said air flow chamber with the interior of said building and a second exhaust aperture connecting said air flow chamber with the exterior of said building.

17. An apparatus as defined in claim 12 wherein said apparatus is mounted in a wall of said building as a window.

18. An apparatus as defined in claim 12 wherein said apparatus is mounted in a ceiling of a building as a skylight.

19. An apparatus as defined in claim 12 wherein said first and second window panes are transparent.

* * * * *

UNITED STATES PATENT AND TRADEMARK OFFICE
CERTIFICATE OF CORRECTION

PATENT NO. : 4,577,619

DATED : March 25, 1986

INVENTOR(S) : WILLIAM C. HOWE, JR.

It is certified that error appears in the above-identified patent and that said Letters Patent is hereby corrected as shown below:

Column 3, line 61, "ould" should be --could--
Column 4, line 62, "so as block" should be --so as to block--
Column 5, line 68, "opening 86" should be --opening 85--
Column 6, line 29, "eqivalency" should be --equivalency--
Column 7, lines 5-6, "for admitting sunlight into the interior of a building" should be deleted
Column 8, line 39, "aperatures" should be --apertures--

Signed and Sealed this

Twelfth Day of August 1986

[SEAL]

Attest:

DONALD J. QUIGG

Attesting Officer

Commissioner of Patents and Trademarks